United States Patent [19]

Lanier

[11] 3,995,794
[45] Dec. 7, 1976

[54] SUPER-SHORT TAKE OFF AND LANDING APPARATUS

[76] Inventor: Edward M. Lanier, 900 Newportville Rd., Croydon, Pa. 19020

[22] Filed: June 24, 1975

[21] Appl. No.: 589,746

[52] U.S. Cl. .................. 244/12 A; 244/48; 244/55; 244/60
[51] Int. Cl.² ........................ B64C 15/12
[58] Field of Search ............. 244/12 A, 7 C, 45 R, 244/48, 55, 56, 60

[56] References Cited

UNITED STATES PATENTS

| | | | |
|---|---|---|---|
| 1,867,963 | 7/1932 | Blahnik | 244/7 C |
| 2,015,150 | 9/1935 | Maxwell | 244/7 C |
| 3,136,499 | 6/1964 | Kessler | 244/60 X |
| 3,477,664 | 11/1969 | Jones | 244/48 X |
| R18,181 | 9/1931 | Stelzer | 244/48 X |

*Primary Examiner*—Trygve M. Blix
*Assistant Examiner*—Barry L. Kelmachter

[57] ABSTRACT

An aircraft provided with airfoils of the non-rotating type that are configured and arranged to provide greater lift while at the same time offering stable flight at ultra-low airspeeds. The airfoils are arranged as a biplane and consist of a fixed wing and a movable wing which are designed so as to permit a much steeper takeoff and landing angle as well as offering more efficient flight at higher speeds with greater inherent safety.

11 Claims, 11 Drawing Figures

SUPER-SHORT TAKE OFF AND LANDING APPARATUS

BACKGROUND OF THE INVENTION

This invention relates to aeronautics and more specifically to airfoils, of the so called biplane type, and their relationship and arrangement with respect to one another as distinguished from airfoil construction.

The design of an aircraft, particularly commercial and corporate types, which can safely operate in limited areas, such as city centers and suburban airports, has been and still is a goal of the aircraft industry. In this endeavor the industry has leaned towards a VTOL, vertical take off and landing, and STOL, short take off and landing, aircraft. The complexity of the VTOL type of aircraft together with its marginal safety and performance in certain flight areas, as well as its high cost, has resulted in directing the efforts of some manufacturers towards the STOL concept.

In the majority of instances a VTOL aircraft utilizes a rotary wing or a tilt-jet flow principle for propulsion, such as in the British Harrier type of aircraft. As distinguished from the foregoing a STOL aircraft employs lower wing and power loadings plus high lift devices, such as large slots and flaps to increase the lift characteristics of the aircraft and thus provide various degrees of STOL capability.

It is known that aspect ratio serves an important function in aircraft wing design. A high performance glider is made with a very high aspect ratio while a high aspect ratio is employed in high load cargo or passenger planes. The high aspect ratio provides less induced drag and a higher lift at a lower angle of attack while increasing the range of the aircraft. On the other hand the same type of aircraft having a very low aspect ratio wing would be relatively inefficient.

A very low aspect ratio wing of proper design gives high lift and drag at large landing angles. However its drag is low at angles of attack as is its lift. A low aspect ratio wing is less efficient than a high aspect ratio wing for high load long range duties, but a low aspect ratio wing is very good for steep approach landings while its tall angle of attack is very high. Thus each type has its advantages and its disadvantages.

SUMMARY OF THE INVENTION

The present invention is directed to a STOL type of aircraft utilizing the principle of a biplane in conjunction with certain of the advantages of both a high aspect ratio wing and a low aspect ratio wing. The aircraft is provided with a variable movable upper wing and a fixed lower wing that is provided with circulation augmenters. The movable or variable upper wing is pivotally mounted upon suitable forward supports so the wing can change its angle of incidence in relation to the position of the lower fixed wing. The foregoing arrangement permits the upper wing to achieve, within reason and independent of the lower wing, any position or angle of attack that might be desired.

The present invention tends to increase the lift of the circulation augmented lower fixed wing on take-off and landing by the creation of a trough or channel effect of accelerated air flowing from the variable movable wing that is caused by the positive change of angle of attack of said movable wing. The lower fixed wing is of a high aspect ratio type while the movable upper wing is a low aspect ratio type. The adjustability of the upper wing enables same to be unloaded by decreasing its angle of attack so that said wing is capable of floating through a certain plus and minus range. Such an arrangement permits the upper wing to automatically seek the minimum drag cruise or high speed incidence positioned for various total aircraft loadings. In this manner most of the total aircraft lift is shifted to the fixed bottom high aspect ratio wing with its low induced drag and thereby increasing the wing loading of the lower wing. The upper wing thus functions mostly as a streamlined nacelle for the engines and for giving directional stability. This is important for smooth high speed flying.

One of the objects of the present invention is to provide an aircraft having a fixed large span lower wing and a movable or adjustable short span upper wing. The adjustability or movability of the upper wing in relation to the fixed lower wing tends to provide for optimum cruise and high speed characteristics plus optimum load carrying and super short take-off and landing at slow speed characteristics in a single aircraft. Thus the concept of the present invention will provide for an aircraft having a super-slow take-off and landing characteristics, plus an unusually high cruising speed per horsepower with high load capabilities, plus ultra safety.

DESCRIPTION OF THE PREFERRED EMBODIMENT

Figure 1:
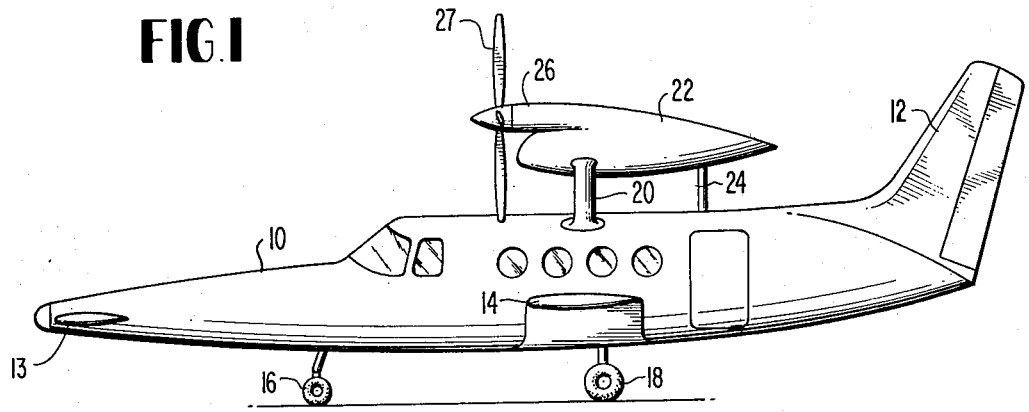
FIG. 1 is a side elevational view of an aircraft embodying the wing design and arrangement of the present invention.

Referring to the drawings there is shown in FIG. 1 an aircraft having a fuselage 10 with a vertical fin and rudder assembly 12. A horizontal stabilizer 13 is provided in the nose portion of the aircraft as distinguished from having same mounted in the conventional manner in the empennage. The fuselage 10 has mounted thereon a fixed bottom or lower high aspect ratio wing 14. A conventional nose wheel 16 is mounted on the lower surface of the forward portion of the fuselage 10 while the lower surface of the bottom wing 14 is provided with the conventional main landing gear and wheels 18.

Figure 10:
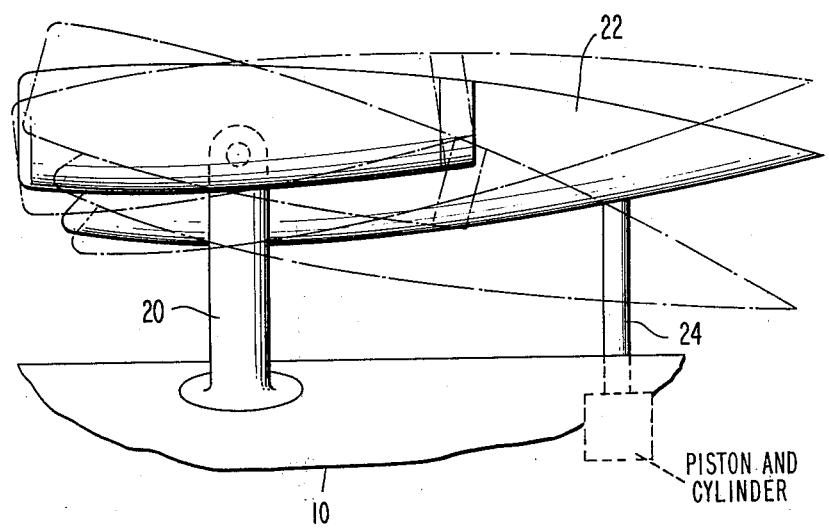
FIG. 10 is an enlarged detail view of a portion of the upper wing shown in FIG. 1.

The upper surface of the fuselage 10 is provided with a pair of verically extending streamlined support members 20 that are disposed about mid-chordwise of the fixed lower wing 14. The support members 20 are each disposed at an acute angle with respect to a vertical plane through the fuselage 10 and lower wing 14 and are secured at their outer ends to the lower surface of an upper low aspect ratio wing 22. The outer ends of the support members 20 are secured to the upper wing 22 in such a manner as to permit the wing to move or pivot with respect to said supports, in the manner as shown in broken lines in FIG. 10, so that said movement provides for a variable incidence upper wing 22. The support members 20 are preferably streamlined and same are attached or hinged to the upper wing 22 near its center of lift.

The aft of trailing edge of the upper wing is provided with a single streamlined support 24 that is carried by the fuselage 10. The support 24 is capable of vertical movement or adjustment which may be occasioned by hydraulic means, such as a piston and cylinder structure of a suitable mechanical movement such as a vertically movable shaft. The movement or adjustment of the support 24 causes the upper wing 22 to pivot about or with respect to the forward support members 20 so that said wing can become variable and change its angle of incidence in relation to the lower fixed wing 14 and by the pivotal connection to the support members 20 the upper wing can achieve any position or angle of attack desired independent of the aircraft attitude.

Figure 2:
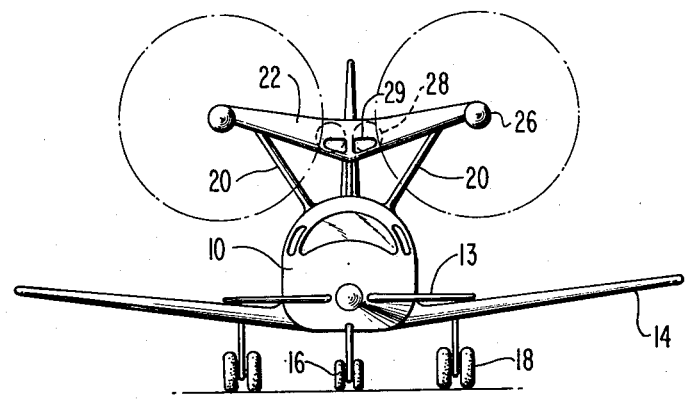
FIG. 2 is a front elevational view of the aircraft shown in FIG. 1.
Figure 11:
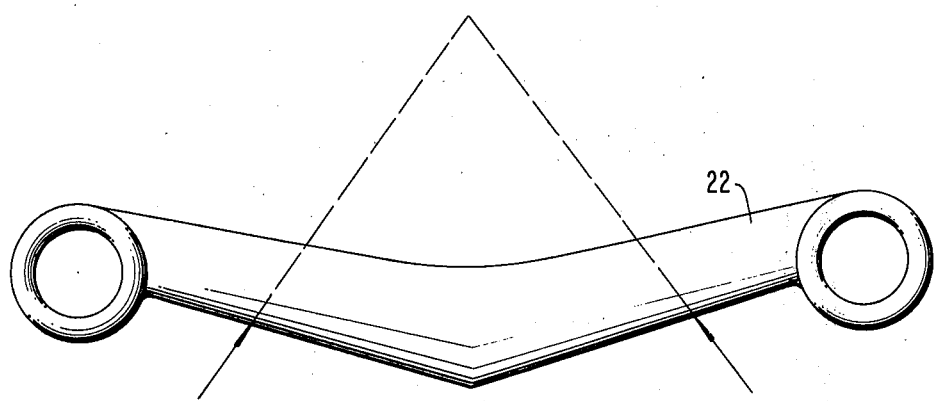
FIG. 11 is an enlarged front elevational view of the upper wing shown in FIG. 2.

The upper wing 22, as illustrated in FIGS. 2 and 11 is relatively thick and is of small span with rather large dihedral angles. This shape of the upper wing extends from the forward or leading edge to the trailing edge and is relatively true and consistent for both the top and bottom of the airfoil. A wing having this configuration of a deep chord and narrow span with large degrees of dihedral tends to give less drag at speeds corresponding to climb and cruise. Such a wing at high positive incidence angles tends to create a certain type of drag effect that is needed for ultra slow landings. An upper wing of the foregoing type or shape would not provide for a practical airplane without having a lower large span fixed wing 14 in combination therewith.

Figure 3:
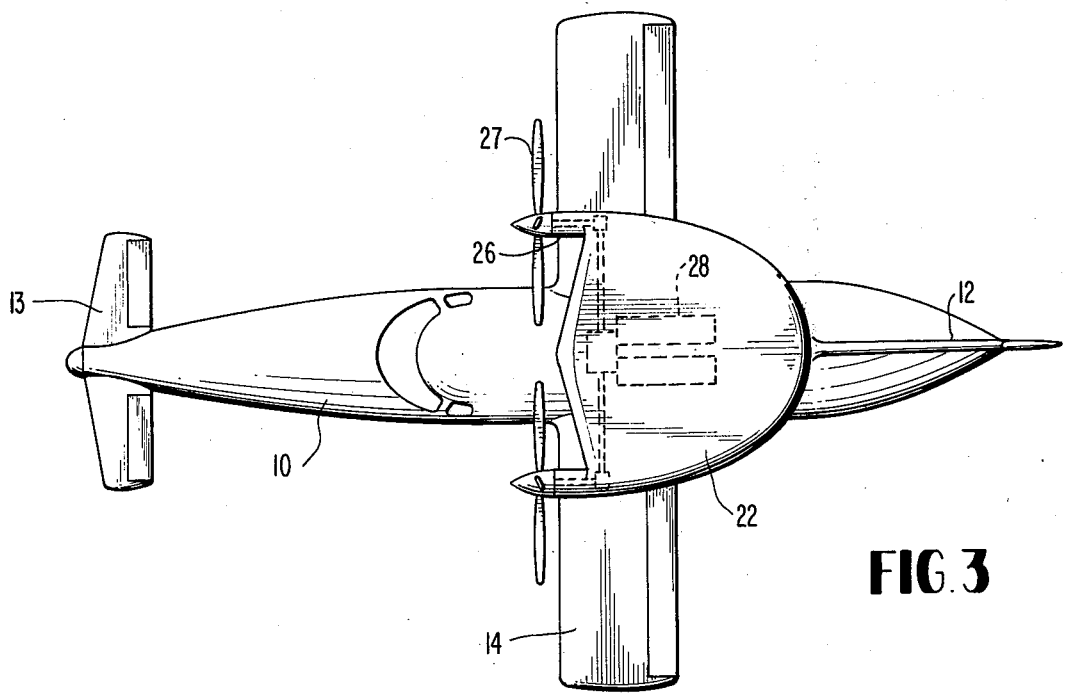
FIG. 3 is a top plan view of the aircraft shown in FIG. 1.

The direction of lift forces on said upper wing 22 is shown in FIG. 11 by broken line arrows that terminate in an apex which is the center line of the aircraft. This forms a stability factor that assumes considerable importance when the aircraft is travelling at ultra-slow speeds. The shape of the upper wing also provides for a trough effect on the upper surface which tends to protect against the loss of low pressure or partial vacuum on said surface. The upper wing 22 is provided with a pair of jet turbo-shaft engines 26 that are embedded in said upper wing and are provided with contra-rotating propellers 27. As shown in FIG. 3 the engines 26 are cross shafted by means of a central gear box 28 so if one engine should fail both of the propellers 27 would continue to operate from the remaining engine. The upper wing 22 is also provided on its leading edge with air intakes 29 for the turbo-shaft engines 26 and the exhaust from said engines may be directed to an exit on the trailing edge of said upper wing to further increase the lift characteristics of the aircraft. It is to be understood that in lieu of the jet turbo-shaft engines 26 that turbo prop engines could be employed.

The upper wing 22 is, by means of the adjustable support 24, adjusted to the desired angle of attack so that the angle of incidence of the variable incidence upper wing in relation to the lower fixed wing position will be set and locked in said position for short steep take-off or for steep approach and short landings. If the upper wing is thus set for take-off, then after the take-off a level flight attitude has been realized, the upper wing 22, through the adjustable support 24, may have its angle of attack decreased until said wing is unloaded which would be the condition of optimum high speed and cruise performance. Thus most of the total lift of the aircraft would then be shifted to the bottom high aspect ratio wing 14. The upper wing 22, through its pivotal connection to the forward supports 20 and the adjustable rear support 24, could be arranged to float through a range of possibly 4° negative to a 4° positive incidence range so that the upper wing would automatically seek the minimum drag cruise or high speed incidence position dependent upon the airfcraft loading.

Thus when the aircraft takes off and climbs to its designated altitude it is then prepared for traveling to its destination at cruising speed by unloading the top or upper wing. When the top wing is unloaded by the pilot through the support 24 the upper wing will automatically seek its lowest drag angle for a given aircraft cargo, passenger and fuel weight. At this time the upper wing can establish its minimum drag attitude in coordination with the fixed lower wing and the overall aircraft and thereby produce a highly efficient cruising speed for large variable passenger and cargo loads. When the upper wing 22 reaches the aforementioned conditions the pilot then through the adjustable support 24 is able to lock the wing in said position. When so locked most of the lift will be shifted to the lower wide span fixed wing 14 and its true wing loading will increase while the true wing loading of the upper narrow span wing 22 will decrease. In this unloaded condition the upper wing 22 is acting in the manner of a streamlined nacelle. When the aircraft subsequently approaches an airport for the purpose of landing to discharge passengers and cargo the upper wing is again adjusted by the pilot to the correct angle of attack for landing which of course changes the angle of incidence of the upper wing 22 with respect to the fixed lower wing 14. If after landing additional fuel or cargo is added or the passenger loading is changed the pilot will upon taking the aircraft off and climbing to his designated cruising altitude will upon reaching said altitude readjust the setting of the upper wing for minimum drag attitude after which said upper wing can be locked into position by the adjustable support 24.

Figure 4:
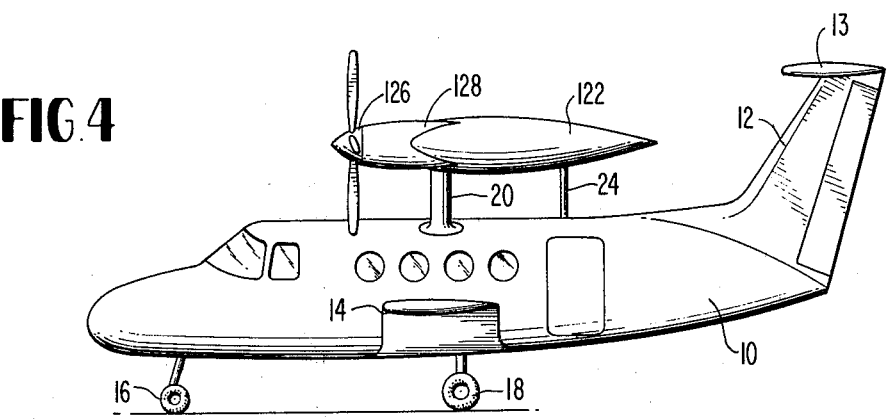
FIG. 4 is a side elevational view of an aircraft constituting a modification of the wing design and arrangement of the present invention.
Figure 5:
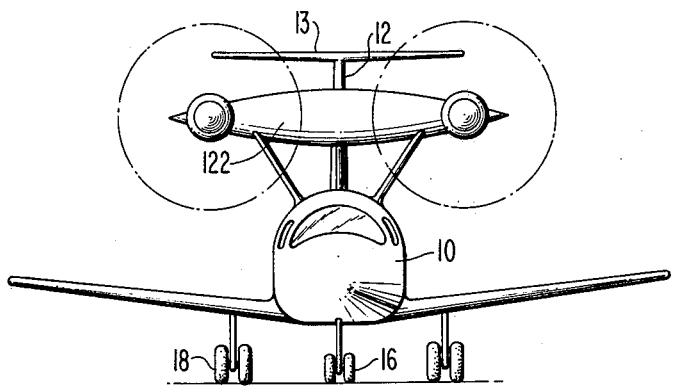
FIG. 5 is a front elevational view of the aircraft shown in FIG. 4.
Figure 6:
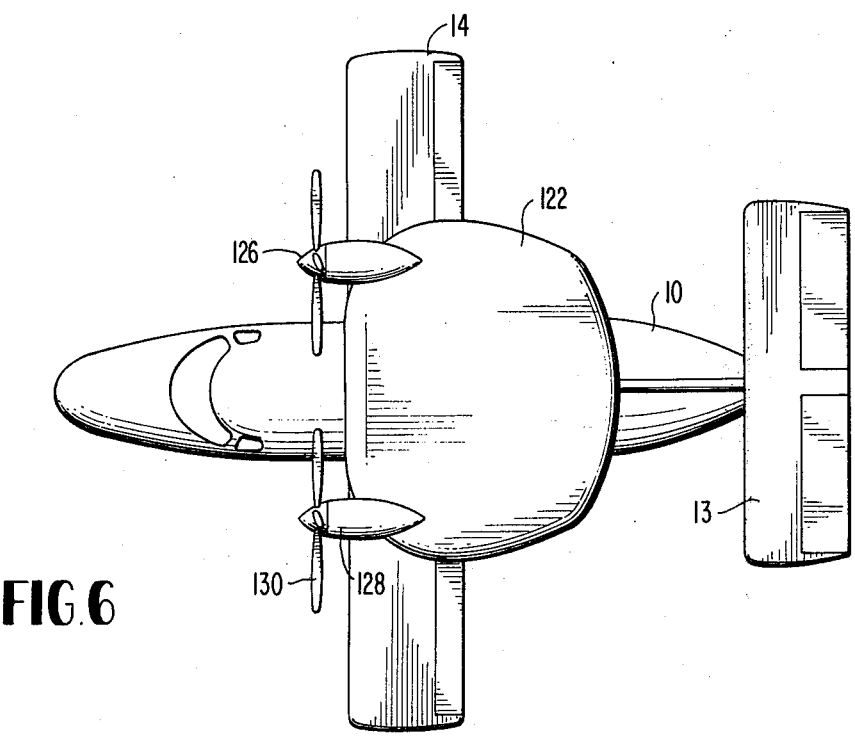
FIG. 6 is a top plan view of the aircraft shown in FIG. 4.

There is shown in FIGS. 4 to 6 a modified version of the aircraft of FIG. 1 in that the upper wing 122 does not embody the center line of chord dihedral angles such as shown in FIG. 2. The upper wing 122 is provided with a pair of engines 126 which are positioned within suitable nacelles 128 to provide for a streamlining effect, although it is to be noted that the nacelles extend both above and below the wing. The engines 126 are provided with propellers 130 which may be of the high lift design in order to afford maximum lift to the aircraft in its short take-off procedure. In view of the high angle of attack at which the upper wing may safely operate, the lift of the propellers becomes a very sizeable factor as the air flow from the propellers flows over the low aspect ratio narrow span upper wing 22. The change or variance of the angle of attack of the upper wing 22 will result in the creation of a trough or channel effect with respect to the lower fixed wing 14 so that the lift of said lower wing will be further increased. In addition the slipstream from the propellers 130 will further increase the acceleration of air moving through said trough or channel and thus increase the lift of the lower wing particularly at take-off and landing attitudes.

Figure 7:
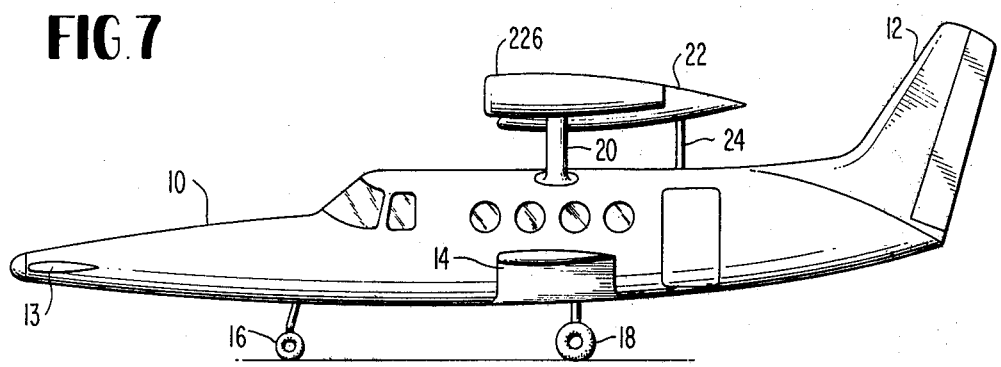
FIG. 7 is a side elevational view of an aircraft constituting another modification of the present invention.
Figure 8:
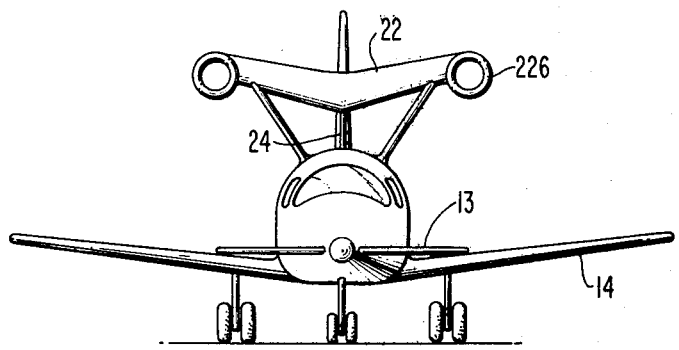
FIG. 8 is a front elevational view of the aircraft shown in FIG. 7.
Figure 9:
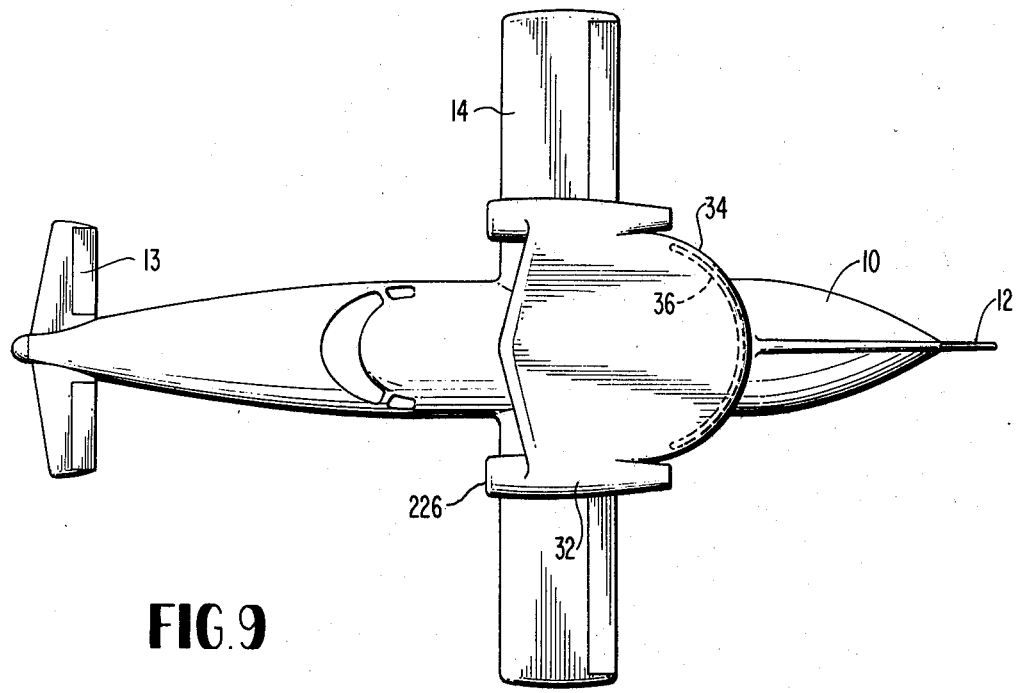
FIG. 9 is a top plan view of the aircraft shown in FIG. 4.

The aircraft shown in FIG. 7 through 9 is similar in most respects to the aircraft shown in FIGS. 1 through 3 as the upper wing 22 is provided with the same dihedral angles. The aircraft of FIGS. 7 through 9 is provided with a pair of jet engines 226 in the upper wing 22 which engines are positioned within suitable nacelles 32. The upper wing 22 substantially encompasses the engines 226 and the exhaust from said engines may be ducted to the trailing edge 34 of the wing 22 where suitable exits 36, FIG. 9, are provided.

As regards the upper wing support members 20, in the various forms as illustrated, it is important that the pivot points or rotation points of the upper wing on said supports be on the center of lift for a given airfoil section. This may readily vary with different airfoil sections from approximately 25% to 50% of the wing chord. The necessity of having the pivot point or points on the center of lift of the upper wing 22 becomes apparent when it is realized that the wing is unloaded and the aircraft is on automatic pilot if the attaching point is rearward or forward of the center of lift position the free floating upper wing, will at cruising speed, exert either a nose up or nose down pitching moment. Thus if the attaching or rotation point of the upper wing 22 with respect to the supports 20 is not on the center of lift of the wing, the wing will be fighting itself and the aircraft and this would defeat the automatic unloading factor of the present invention.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. An aircraft having a fuselage and empennage with a fixed lower wing attached to said fuselage, an upper wing pivotally connected at its center of lift on spaced means carried by said fuselage and with said upper wing being disposed in spaced parallel relationship to said lower wing, power means carried by said upper wing for propelling said aircraft, and adjustable means carried by said fuselage in spaced relation to said spaced means and connected to said upper wing to unload lift and drag aerodynamically through a small minus and plus degrees movement of said upper wing about said center of lift to transfer major lift of said upper wing to said lower wing and reduce total drag of said upper wing for optimum cruise and high speed flight.

2. An aircraft as defined in claim 1 wherein said upper wing is provided with a plurality of nacelles with an engine mounted in each nacelle.

3. An aircraft as defined in claim 1 wherein said upper wing is formed with a deep chord and relatively large dihedral angles extending from the forward to the trailing edge of said upper wing.

4. An aircraft as defined in claim 1 wherein said spaced means comprising a pair of spaced upwardly inclined support members, said upper wing being pivotally connected at its center of lift to said support members.

5. An aircraft as defined in claim 2 wherein said engines are provided with contra-rotating propellers and said upper wing is provided with cross shafting and a central gear box to cause said propellers to continue to operate upon the failure of one of said engines.

6. An aircraft as defined in claim 4 wherein said adjustable means comprising an adjustable support member spaced from said pair of support members and connected to said upper wing adjacent the trailing edge for adjusting said upper wing with respect to said lower wing.

7. An aircraft as defined in claim 6 wherein said adjustable support member includes a fluid actuated piston and cylinder structure.

8. An aircraft as defined in claim 6 wherein said upper low aspect ratio wing is offset with respect to the fixed lower high aspect ratio wing and said upper wing is adjustable with respect to the lower wing to change the angle of attack of said upper wing while creating a trough or channel effect of accelerated air flowing from the movable upper wing to increase the lift of the lower wing upon take-off or landing of said aircraft.

9. An aircraft as defined in claim 6 wherein said adjustable support member permits said upper wing to automatically seek its minimum overall drag for top cruise and top speed of said aircraft.

10. An aircraft as defined in claim 6 wherein said upper wing is capable of floating within a comparatively small positive and negative degree angle relative to the fixed lower wing and automatically adjusts itself to minimum overall drag of the aircraft.

11. An aircraft as defined in claim 2 wherein said upper wing is provided with engine exhaust ducts at its trailing edge to increase lift and performance of sid aircraft.

* * * * *